United States Patent [19]

Holland

[11] Patent Number: 5,507,276
[45] Date of Patent: Apr. 16, 1996

[54] CONCENTRATING SOLAR COLLECTOR CROSS SECTION

[76] Inventor: Beecher J. Holland, 600 Morisol Ave., Kingsport, Tenn. 37660

[21] Appl. No.: 349,690

[22] Filed: Dec. 5, 1994

[51] Int. Cl.$^6$ .................................................. F24J 7/10
[52] U.S. Cl. ................................ 126/693; 126/694
[58] Field of Search .................... 126/692, 693, 126/694, 695; 353/98

[56] References Cited

U.S. PATENT DOCUMENTS

| | | | |
|---|---|---|---|
| 4,098,264 | 7/1978 | Brokaw | 126/694 |
| 4,121,566 | 10/1978 | Radenkovic | 126/692 |
| 4,138,994 | 2/1979 | Shipley | 126/694 |
| 4,266,858 | 5/1981 | Holland | 350/296 |
| 4,311,132 | 1/1982 | Kuijk | 126/438 |
| 4,326,502 | 4/1982 | Radenkovic | 126/685 |
| 4,396,008 | 8/1983 | Kuijk . | |
| 4,529,831 | 7/1985 | Gill et al. | 126/694 |
| 4,543,946 | 10/1985 | Gill et al. | 126/694 |
| 5,174,275 | 12/1992 | Holland | 126/684 |

*Primary Examiner*—Carroll B. Dority

[57] ABSTRACT

The present invention is a cross-section arrangement for solar concentrators which is comprised of a concave reflective boundary, and of at least two receiver-converters extending outward within the concavity wherein the second receiver-converter is well removed from the first and the multiple receiver-converters may communicate with each other.

1 Claim, 1 Drawing Sheet

CONCENTRATING SOLAR COLLECTOR CROSS SECTION

| PRIOR ART U.S. Pat. Documents | | | |
|---|---|---|---|
| 4,266,858 | 5/1981 | Holland | 350/296 |
| 4,311,132 | 1/1982 | VanKuijk | 126/438 |
| 4,396,008 | 8/1983 | VanKuijk | 126/438 |
| 4,529,831 | 7/1985 | Gill et al | 136/248 |
| 5,174,275 | 12/1992 | Holland | 126/684 |

BACKGROUND OF THE INVENTION

The present invention, a solar concentrator cross-section design, consists of a concave reflective boundary and of a first receiver-converter (a term intended to embrace conversion to forms of energy such as heat and electricity) extending from the base of the concavity outward toward the aperture of the reflective boundary and of at least a second receiver-converter following outward after said first toward said aperture wherein said second receiver-converter is well removed from said first and the multiple receiver-converters may communicate with each other. The considerable removal of said second receiver-converter from said first is as far as at least partly within the major portion of the distance from said base to said aperture up to as far as said aperture and at least as far as one and one-half times the distance from said base at the point from which extension of said first receiver-converter begins to the termination of said first receiver-converter nearest said aperture. Said removal is important to reducing interference by said second receiver-converter with reception of radiation on said first on which high concentration ratio is desired. The considerable extent of such interference reduction is not realized without analytical examination.

The object of the present invention is to provide a solar collector embracing an excellent combination of capacity, concentration ratio and efficiency which is appropriate and economical for space and water heating and feed chemical preheating.

The present invention would serve well as the cross-sectional design of an end-to-end tilted, linear trough for heating of a liquid in the two receiver-converters which would run lengthwise in the trough and transport the liquid, the first receiver-converter (in the base of the trough) is the hot tube and the second is the "cold" tube. Placement of both hot and "cold" tubes in the trough more nearly assures (by placing both tubes in the same environment) that both tubes will achieve equal temperatures with minimum delay during an extended absence of sunlight. Such is important because the embodiment is intended to depend on passive, natural circulation (no pumps, no valves, no draining of tubes at night) from a reservoir, down the "cold" tube and back up the hot tube and then to the reservoir, as a result of the liquid in the hot tube being less dense, thus lighter, than that in the "cold" tube. In a prolonged absence of sunlight, it is important that both tubes attain the same temperature readily to avoid circulation and cooling of reservoir contents. Both tubes enter said reservoir from essentially the same level.

SUMMARY OF THE INVENTION

The present invention, a concave solar concentrator cross-section arrangement, is comprised of a reflective concave boundary, a first receiver-converter extending outward from the base of the concavity and at least a second receiver-converter following said first wherein the multiple receiver-converters may communicate with each other and said second receiver-converter is well removed from said first.

BRIEF DESCRIPTION OF THE DRAWING

The object, design and functioning of the invention will be clarified hereinafter by this specification with reference to the accompanying drawing wherein:

Referring to FIG. 1, the concentrator cross-section is comprised of a concave reflective boundary item 1 which is made up of a circular section base area and of straight tangential extensions from said circular section and said cross-section is further comprised of a first receiver-converter item 2 and second receiver-converter item 3, both said receiver-converters being essentially symmetrical about the cross-section longitudinal centerline and of the aperture, opening where light enters, item 4. Item 5 is sunlight.

Figure 1:
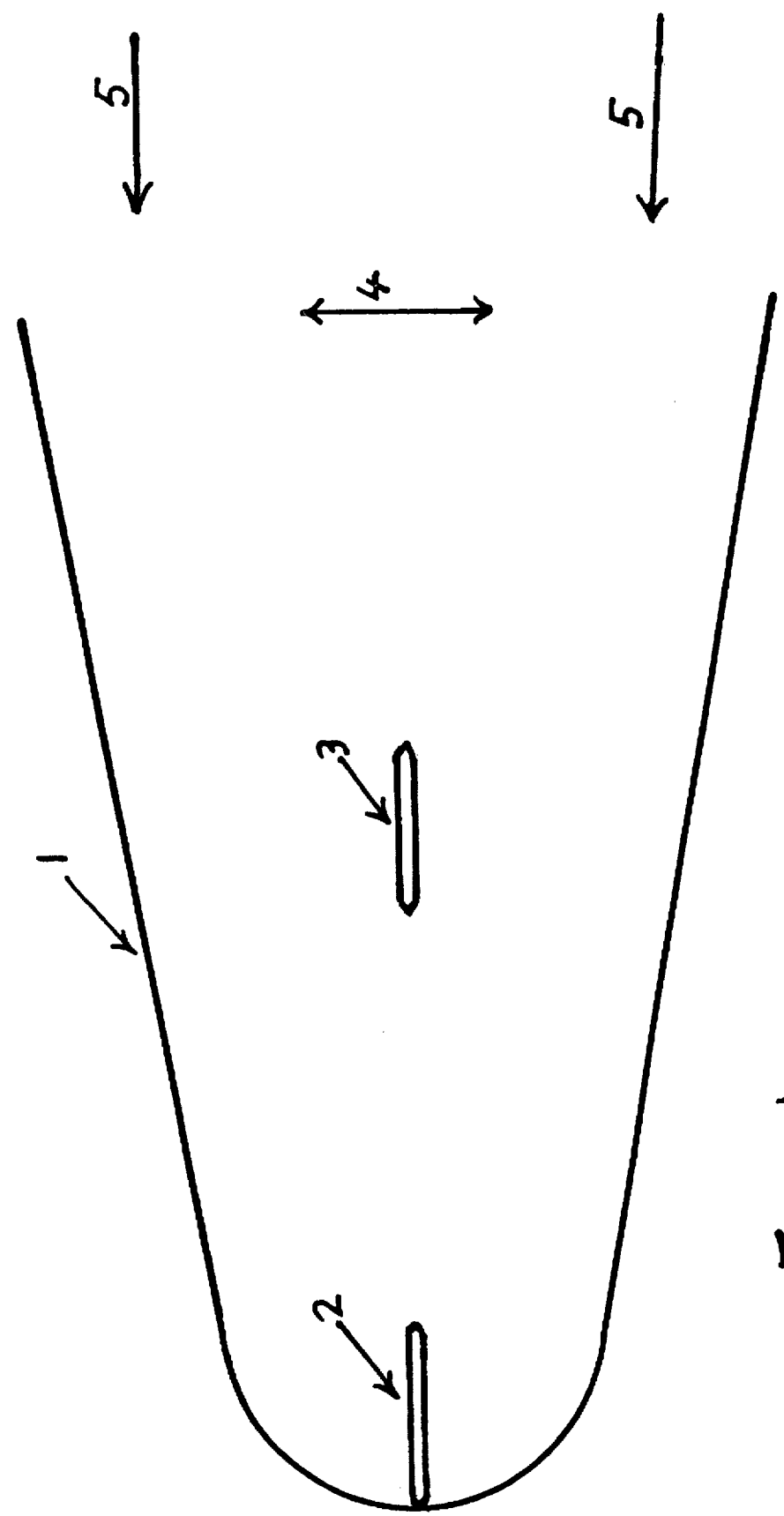
FIG. 1 is one embodiment of the concentrator cross-section arrangement invented.

The preferred embodiment is as presented by FIG. 1 and its description. Item 1 of FIG. 1 is readily made from galvanized sheet in the instance of a linear trough. Items 2 and 3 can be formed from tubing. When item 1 is formed from conductive material, an insulating strip should be placed between item 1 and item 2. Item 4 is the aperture. Item 5 is sunlight.

I claim:

1. A solar concentrator cross-section arrangement comprised of a concave reflective boundary comprising a circular base section having straight sides extending therefrom, and a first flattened, hollow receiver-converter extending outward from the base of the concavity toward an aperture of said boundary and said second receiver-converter is well removed from said first, being removed as far as at least partly within the major portion of the distance from said base to said aperture up to as far as said aperture and at least as far as one and one-half times the distance from said base at the point from which extension of said first receiver-converter begins to the termination of said first receiver-converter nearest said aperture, of at least a second flattened, hollow receiver-converter following outward after said first, the multiple receiver-converters being able to communicate with each other and positioned such that the first and second receiver-converters have their flattened cross-sections extending in a common plane bisecting said concave reflective boundary.

* * * * *

UNITED STATES PATENT AND TRADEMARK OFFICE
CERTIFICATE OF CORRECTION

PATENT NO. : 5,507,276     Page 1 of 2
DATED : April 16, 1996
INVENTOR(S) : Beecher J. Holland It is certified that error appears in the above-indentified patent and that said Letters Patent is hereby corrected as shown below:

On the title page, item
  [76] Inventor: reads . . Morisol Ave. . . should be . . Morison Ave. . .
Column 2,
  Claim 1 should read:

1. A solar concentrator cross-section arrangement comprised of a concave reflective boundary comprising a circular base section having straight sides extending therefrom, a first flattened, hollow receiver-converter extending outward from the base of the concavity toward an aperture of said boundary and of at least a second flattened, hollow receiver-converter following outward after said first, the multiple receiver-converters being able to communicate with each other and positioned such that the first and second receiver-converters have their flattened cross sections extending in a common plane bisecting said concave reflective boundary;

UNITED STATES PATENT AND TRADEMARK OFFICE
CERTIFICATE OF CORRECTION

PATENT NO.   : 5,507,276
DATED        : April 16, 1996
INVENTOR(S)  : Beecher J. Holland It is certified that error appears in the above-indentified patent and that said Letters Patent is hereby corrected as shown below:

said second receiver converter is well removed from said first, being removed as far as at least partly within the major portion of the distance from said base to said aperture up to as far as said aperture and at least as far as one and one-half times the distance from said base at the point from which extension of said first receiver-converter begins to the termination of said first receiver-converter nearest said aperture.

Signed and Sealed this

Tenth Day of December, 1996

Attest:

BRUCE LEHMAN

Attesting Officer

Commissioner of Patents and Trademarks